264-235.6 SR CROSS REFERENCE SEARCH ROOM

XR RE 26,614

United

Re. 26,614

Reissued June 24, 1969

26,614

HOMOPOLYAMIDE OF RECURRING BIS(PARA-AMINOCYCLOHEXYL)METHANE AZELAMIDE UNITS

Filon Alexander Gadecki, Signal Mountain, Tenn., and Stanley B. Speck, Wilmington, Del., assignors to E. I. du Pont de Nemours and Company, Wilmington, Del., a corporation of Delaware No Drawing. Original No. 3,249,591, dated May 3, 1966, Ser. No. 199,261, June 1, 1962. Application for reissue May 2, 1968, Ser. No. 736,236

Int. Cl. C08g *20/20;* D03d *15/00*

U.S. Cl. 260—78 4 Claims

Matter enclosed in heavy brackets [ ] appears in the original patent but forms no part of this reissue specification; matter printed in italics indicates the additions made by reissue.

*ABSTRACT OF THE DISCLOSURE*

*Filaments of poly[bis(para-aminocyclohexyl)methane azelamide], wherein at least 55% of the para-aminocyclohexyl methane units are of the trans-trans isomer, which filaments exhibit a nuclear magnetic resonance "loosening" factor of less than about 2.5, have low shrinkage and excellent silk-like resilience.*

This invention relates to fibers of linear polyamides. More specifically, this invention relates to polyamide fabrics having improved resilience and silk-like hand, combined with superior wash-wear performance.

Fibers from polyamides such as polyhexamethylene adipamide (66-nylon) and polycaprolactam (6-nylon) are well known for producing fabrics of excellent durability, high strength and good chemical resistance. The fabrics are soft and flexible, but are not notably outstanding in resilience.

The synthetic fiber industry has long sought a fabric that would have the hand, drape and other aesthetics of silk. Silk is noted for the almost explosive way in which it bursts from the hand after it has been crumpled into a tight ball. Attempts have been made to synthesize polyamides from which fibers having this resilience can be prepared. Such polyamides have usually contained aromatic or cycloaliphatic rings in the polyamide chain. Unfortunately, these polyamides are very intractable, being sometimes infusible, and almost always hard to extrude due to high melt viscosity and difficult to draw due to lack of polymer chain mobility.

While silk has desirable aesthetic properties, it is notably deficient in what has been termed "ease of care" or "wash-and-wear" performance. The modern demand is for fabrics which require a minimum amount of ironing, and which can be laundered in home laundry equipment, preferably requiring merely drip drying before wearing. Although some synthetic fabrics meet this goal, for example, polyethylene terephthalate, the synthetic fibers fail to provide fabrics with the rich hand of natural silk.

A test has been developed which can be applied to an individual fiber, by which wash-wear performance can be predicted. It has been found that the tensile strain recovery (abbreviated TSR for convenience) adequately predicts wash-wear performance of a fabric when subjected to a standard "C" or "D" wash procedure. In one test, fibers are stretched 0.5 to 3% in 40° C. water, and are then allowed to recover in air at room temperature, without drying. The average recovery in percent gives a measure of "D" wash performance. In general, a TSR value of 40% is considered to be the minimum for acceptable wash-wear performance. Higher values are even more desirable. A second fiber test, called "wash-set recovery angle" (abbreviated WSRA) correlates with "C" wash. It is described in detail hereinafter.

Apart from desirable "wash-and-wear" characteristics, it is essential that modern fabrics be dyeable and heat settable by conventional procedures. Consequently they must be stable to aqueous boil and to dry heat setting at about 180° C.

It has been discovered that polyamides having certain molecular building blocks can be spun, drawn and subjected to an optional after-treatment thereby producing a yarn of specified structure, which may be woven to fabrics having both excellent resilience and superior wash-wear performance. The required structure is identified by X-ray and optical parameters, or alternatively, by nuclear magnetic resonance (NMR).

The class of polymers useful for producing filaments of this structure is among those disclosed in U.S. Patent No. 2,512,606 to Bolton and Kirk. These polymers are prepared from the diamine bis(para-aminocyclohexyl) methane, abbreviated PACM herein, for convenience. This diamine, due to its carbo-cyclic nature, is a mixture of isomers, having trans-trans (tt) cis-trans (ct) and cis-cis (cc) configurations. Hydrogenation conditions used in preparing the diamine result in a mixture of isomers which may be either liquid or solid at room temperature, as disclosed in the above patent. The patent describes preparation of filaments from the polymer of sebacic acid and either the liquid or the solid mixture of isomers. These filaments are disclosed to have a high tensile and torsion recovery.

One disadvantage of PACM–10 polymer is that it requires the use of sebacic acid, which is expensive and limited in supply, since it is derived from a natural product (castor oil). In addition the polymerization process is unduly expensive since the salt of PACM and sebacic acid is not water soluble enough to permit a water strike. It is usually prepared by reaction in methanol prior to polymerizing, which adds to the expense of the product.

The polymer from bis(para-aminocyclohexyl)methane and azelaic acid (PACM–9) does not suffer from these disadvantages, since azelaic acid is available from low cost intermediates. Moreover, the salt is water soluble. The as-drawn filaments from the polymer of liquid PACM with sebacic acid (i.e., liquid PACM–10) are not stable to dyeing and heat-setting treatments, since these treatments cause the filaments to shrink excessively and fuse. This limits their utility to fabrics where such treatment is not required. Yarn from the polymer of solid PACM–10 does not suffer from this deficiency. Unfortunately, experiment shows that neither the liquid nor the solid mixture of PACM isomers disclosed by Bolten and Kirk can be polymerized with azelaic acid to make a polyamide yarn which can be subjected to conventional finishing procedures. Both are too heat sensitive. When subjected to boiling water and dry heat setting, the filaments fuse into a brittle, unitary yarn which cannot be separated.

The adverse effect of conventional finishing procedures on filaments of liquid PACM–9 was not surprising in view of a similar effect on the filaments of homologous liquid PACM–10. However, the different behavior of the polymers from solid PACM–10 and PACM–9 respectively, towards heat is indeed unexpected, especially since the polymers have the same X-ray melting point, and do not show even the normal variation in melting point observed with homologous polyamides having odd vs. even numbers of carbon atoms in the repeating unit. The present invention in providing a polyamide filament based on PACM and azelaic acid which is stable to conventional dyeing and finishing overcomes these difficulties.

An object of this invention is to produce a polyamide

RE26614 filament having low shrinkage and excellent silk-like resilience, and from which silk-like fabrics can be prepared. It is an additional object to provide such filaments from low cost intermediates by convenient processing. Fabrics produced from these filaments give superior wash-and-wear performance, requiring little or no ironing after washing.

These and other objects are attained in a filament from a homopolyamide containing recurring bis(para-aminocyclohexyl)methane-azelamide units as an integral part of the polymer chain, and having an inherent viscosity of at least 0.5, the fiber having an X-ray-optical factor of at least about 0.040 and an NMR "loosening" factor of less than about 2.5. The para-aminocyclohexyl methane units of such a polymer preferably consist of at least 50% of the trans-trans-isomer, as identified by vapor phase chromatography of the diamine or X-ray melting point of the polymer.

The filaments of this invention have a structure which may be identified by characteristic X-ray and optical orientation parameters, which are combined, for convenience, into a single parameter, termed the X-ray-optical orientation factor. This parameter correlates reasonably well with fabric performance in standard washing tests ("C" and "D" wash). It is related to the optical characteristics, polarizability, arrangement and orientation of the molecules themselves. High values of this parameter indicate high molucular orientation accompanied by a high degree of interchain bonding, resulting in greater stability. The shrinkage of this stabilized structure is therefore low, since the potential for molecular rearrangement, which is the basic mechanism of shrinkage, is greatly reduced.

In addition, the filaments of this invention are characterized by a low "loosening factor," as measured by NMR. This factor is a measure of the freedom of motion of the chain segments, and is related to the shrinkage of the yarn which must be held to a tolerable level in order for it to be processed acceptably, and not result in excessive fabric shrinkage.

It is believed that in order for a yarn to shrink, it must have a capacity for rearrangement of the molecular segments. Nuclear magnetic resonance measures motional constraint of segments, the degree being shown by the width of the broad absorption band. This motional constraint has been labeled "matrix rigidity." Since the shrinkage measurement is the result of a boiling water treatment, the matrix rigidity is measured in water at room temperature and at the boil. The difference in these values may be termed the "loosening parameter." High values for this parameter would indicate a large amount of "loosening" as the yarn is exposed to boiling water. Such a large value would be expected to accompany a high degree of shrinkage if there were internal stress within the fiber. Conversely, low values indicate a desirably low tendency to shrink in boiling water. The measurements are taken while the yarn is in the taut condition, under the assumption that this simulates the shrinkage tension that the yarn develops at the boil.

The structure and property determinations used in characterizing the product of this invention are measured on yarn which has been drawn to a standard break elongation of about 15%. The measurements are made before the yarn has been subjected to annealing, relaxing or mock finishing treatments, unless otherwise specified.

The polyamide yarns of this invention are prepared by melt spinning using conventional procedures. The desirable structure, as already indicated, is in part a function of trans-trans (tt) content of the diamine, and to a lesser extent is dependent on the heat treatment the yarn receives subsequent to drawing. In general, the desirable structure is enhanced by a high temperature annealing treatment at constant length. Temperatures of 100 to 200° C. are suitable; usually, the lower temperature range will be preferred for the lower tt isomer content polymers due to their lower heat stability. It is believed that the most effective temperature range is in the vicinity or above the "glass" transition temperature, $T_g$ which is about 160° C. The yarn may be annealed on the package. This may be accomplished by placing the package in an oven containing an inert gas, air or steam atmosphere. Times of from one minute to one hour are satisfactory, primarily controlled by the time required for all yarn to reach the desired temperature. Preferably, however, the annealing treatment is done on the running yarn, immediately after drawing. Heating is suitably accomplished by yarn contact with a hot plate, pin or tube, or by heating in a radiant tube, fluid jet, molten metal or oil bath, fluidized bed, convection heated oven or the like. Treatment should produce a yarn temperature of at least about 100° C. and preferably 150° C. Under these conditions, yarn contact time of 0.001 to 10 seconds are suitable.

The annealing treatment may be combined with a second stage of drawing, which may be followed with a partial relaxation step if desired. These steps intervenpartial relaxation step if desired. These steps may be performed as separate operations, with packaging steps intervening, or as a continuous sequence.

Alternatively, yarn structure may be improved by relaxing treatments, which may be employed to treat skeins of yarn batchwise, but preferably are carried out on the run immediately following drawing. The heating means disclosed for annealing are suitable for relaxing. Superheated steam or hot air injected into a tube as taught by Pitzl in U.S. Patent No. 3,003,222 is satisfactory. The amount of relaxation should be controlled, and should be within the range of 5 to 20%.

The recovery properties (e.g., TSR) of fibers subjected to the relaxation step may appear inferior to the fibers subject to the annealing treatment. This does not necessarily indicate inferior fabric performance. Fabrics made from yarn by either process, after boil-off (which subjects the annealed yarn to a relaxation) are approximately equivalent.

When using steam as the treating fluid under such conditions that liquid water (condensate) remains on the yarn as it leaves the treatment zone, the yarn temperature will obviously be limited by the steam-water equilibrium temperature. Under these conditions, increasing steam temperature may fail to produce the expected improvement, as shown in some of the examples. This problem can be minimized by using superheated steam, pressure treatment cells, or a non-condensing fluid.

It is well known in the synthetic filament art to stabilize oriented filaments against shrinkage by heating them to induce crystallization (see for example U.S. Patent No. 2,880,057). The filaments of the present invention are surprisingly different, in that they are not crystalline, even after the annealing or relaxing treatments. Indead, it is important that heat treating conditions be limited so that the yarn will not crystallize, as shown in Example V. If crystallinity is induced by a high temperature treatment, filaments become weak, stiff and brittle. Thus, treating temperatures above 200° C. should be avoided for lower tt content polymers.

The TSR measurement, used to predict "C" and "D" wash performance is conducted by mounting a 10 in. specimen in the yarn clamps of an Instron Tensile tester, immersing the specimen in 40° C. water for two minutes and then extending to one of the elongations prescribed (0.5, 1.0, 1.5, 2.0, 3.0%); the clamp separation is maintained for a two minute period. The immersion tank is removed from the specimen and the stress dropped to 0.042 g.p.d., and maintained for a two minute period. The Instron clamps are then returned to the original separation and the increase in yarn slack measured. The difference between the amount of elongation imparted to the yarn and the amount of slack remaining after recovery is an indication of the recovery obtained at the specific elongation. The test is repeated with a fresh sample for each elongation.

Recovery is plotted versus elongation, and the area under the curve is integrated; this indicates the average recovery value at 0.042 g.p.d. stress. The final value recorded in the tables is the average of the determinations at the five different elongations. The stress level of 0.042 g.p.d. is chosen to simulate the effect of fiber friction in a fabric.

The wash set recovery angle (WSRA) test is used to predict fabric performance in the "C" wash. In this test, single filament samples are wetted in hot water and dried at room temperature and low humidity while deformed under load. The samples are then allowed to recover and the degree of recovery is measured. In the actual test, the sample is bent 360° around a 0.625 mm. mandrel and is loaded to 0.05 g.p.d. The loaded fiber is immersed for two minutes in a 0.15% aqueous household detergent at 60° C. The sample, still under load, is rinsed for 0.5 minute in cold water, dried 50 minutes at 15% R.H. and room temperature after which it is cut loose and allowed to recover overnight unrestrained at 15% R.H., after which the recovery angle is measured. 360° is complete recovery (e.g., glass fiber) and 0° is no recovery (wool).

The X-ray-optical orientation factor is in the product of the X-ray orientation calculated from the intensity of an X-ray meridional diffraction spot, using the Lorentz polarization theory[1] and the conventional birefringence measured microscopically by the use of a compensator of the Babinet or Berek type[2].

*The X-ray orientation value used in calculating the X-ray-optical orientation factor is determined from a flat-plate, wide-angle X-ray diffraction pattern. This pattern for the subject fibers shows a well-defined meridional reflection at a Bragg spacing of about 10.4 A. and an equatorial diffraction, or amorphous halo, at a Bragg spacing of about 4.7 A. The X-ray orientation is calculated as the ratio of the maximum intensity of this meridional spot divided by the maximum intensity of this equatorial halo. The intensities are measured on the X-ray negatives using conventional microphotometry techniques. The negatives are prepared in a conventional manner using No Screen X-ray film manufactured by the Eastman Kodak Company, Rochester, N.Y. (or X-ray film providing equivalent contrast). The film, is developed for 3 minutes at 20° C. with Kodak X-ray developer at the concentration recommended by the manufacturer.*

*Exposure times for the X-ray negatives should be such that the microphotometer registers optical densities for both regions of less than 1.0 but not less than 0.10. Careful technique must be employed to assure measurement of the maximum density in both regions which is then corrected by subtraction of the proper background density adjacent to each reflection before the ratio calculation. Analysis of both regions must be made on the same X-ray negative. In making the exposure, care must be taken to assure that all of the filaments in the yarn are aligned in a parallel manner (e.g., not twisted). A yarn sample thickness of no more than about 0.50 mm. is used with a sample to film distance of 7.5 cm. A flat-plate vacuum camera is used with nickel filtered copper X-rays at 40 kvp. and 20 ma. current, e.g., with a General Electric Company XRD-5 X-ray unit with a CA-8 X-ray tube. The beam is collimated with an outside pinhole diameter of about 0.625 mm. and an inside pinhole diameter of about 0.50 mm. with a separation of 7.0 cm.*

Matrix rigidity is measured using the nuclear magnetic resonance equipment of Varian Associates, model

[1] C. W. Bunn—Chemical Crystallography—an Introduction to Optical and X-Ray Methods.

[2] German Synthetic Fibre Developments—Textile Res. Institute N.Y., 1946.

V-4302 Dual Purpose Spectrometer and using their high temperature probe insert model No V-4331-TWL and using 56.4 mc./s. radio frequency energy. Yarns are wrapped taut around very thin glass rods and the ends tied to prevent shrinkage during the heating experiment. This wrapping, therefore, provides a random placement of the fiber axis with respect to the magnetic field direction so that an average NMR spectrum is obtained at any temperature. As described in J. G. Powles, Polymer, 1. 219–265 (1960), polymers give a broad absorption spectrum which can be characterized by a half width (peak to peak distance of the derivative output curve, expressed in gauss) herein called matrix rigidity. Values are obtained using 17 db attenuation of the RF field and with a sweep modulation of 1 gauss. To obtain values of the loosening factor, the yarns are soaked overnight in $D_2O$ while wrapped taut and then are heated while immersed in excess $D_2O$. ($D_2O$ is used to prevent an NMR signal from the protons in $H_2O$.) Data points are obtained about every five degrees while heating the yarn in the NMR instrument during an approximate 2-hour period. The matrix rigidity value at 100° C. is obtained as an extrapolation of the straight line through the data points between room temperature and about 95–98° C. This value at 100° C. is subtracted from the matrix rigidity value of the soaked yarn at room temperature to obtain the loosening factor.

Yarns which have been subjected to the "mock finishing" treatment have been boiled off in skeins at 4 mg./denier tension, dried, and have been subjected to a dry heat treatment of one minute at 180° C., permitting only 2% shrinkage. These conditions give an adequate estimate of the response to be expected when fabrics are subjected to standard dyeing and finishing treatment.

The standard tests used herein to simulate home laundering performance are to machine wash the fabric in a tumble type washing machine at a water temperature of 40° C. After the washing period, the fabric load is given a final spin to extract excess water. For the "C" wash test, simulating washing and tumble drying, the fabric load is tumble dried at 77° C. For the "D" wash test, simulating washing and drip drying, the fabric load is removed and hung up to drip-dry for a period of several hours. The washed fabrics are evaluated subjectively, applying the following ratings: 1—excessive wrinkling; 2—considerable wrinkling, unacceptable for wear; 3—wrinkling, may be worn; 4—some wrinkling, acceptable for wear; 5—no wrinkling, books freshly ironed.

The inherent viscosity of the polymer is determined on a solution containing 0.5 gram polymer in 100 ml. m-cresol.

The following examples, in which percentages are by weight unless otherwise indicated, further illustrate the invention.

EXAMPLE I

A polymer is prepared in an autoclave from 50% aqueous solution of the salt of bis-(para-aminocyclohexyl) methane and azelaic acid. The diamine consists of 70% tt, 25% ct and about 5% cc isomers.

It should be noted that regardless of the relative amounts of tt and ct isomers, the amount of cc does not vary greatly from about 5%; thus, giving the tt content of any isomer mixture effectively identifies it.

As viscosity stabilizer, 17.5 millimoles of acetic acid are added for every mole of the polyamide salt. The salt solution is heated under 350 lbs./in.$^2$ pressure for two hours while the temperature is raised at 285° C. The pressure is then reduced to atmospheric while the temperature is raised to 315° C. and the polymer held under these conditions for one hour. It is then extruded and cut to flake. The polymer has an inherent viscosity of 0.82. The polymer is melted and filaments are extruded at a temperature of 315° C. through a 34-hole spinneret The yarn (about 70 denier) is then drawn 3 times its extruded length over a snubbing pin at a temperature of 100° C. The yarn is then subjected to a constant length anneal by passing over a plate heated to 160° C. The contact time is 0.21 second.

After boil-off, without heat set, the yarn is also subjected to the WSRA test, with the results shown in the following table. The work recovery from 5% stretch (WR), and TSR are also listed. Corresponding data for other well known fibers are also listed, as well as "C" wash results for fabrics made therefrom.

TABLE I

| Fiber | WSRA, Degrees | "C" Wash | Percent TSR | Percent WR |
|---|---|---|---|---|
| PACM-9 | 285 | 2.6 | 70 | 70 |
| Polyethylene terephthalate | 250 | 2.4 | 60 | 27 |
| 66 nylon | 220 | 2.0 | 40 | 61 |
| Silk | 27 | 1.3 | 50 | 26 |

EXAMPLE II

This example demonstrates the unexpected improvement in TSR, as the structure shown by the X-ray-optical factor and NMR "loosening" is improved by increasing the tt-isomer content of the PACM-9 polymer.

Yarn is spun and drawn from polymer of varying isomer content, according to the procedure of Example I. Yarn properties are measured after "mock finishing." The column headed "strength loss" lists the strength reduction due to "mock finishing."

TABLE II

[Yarn properties after "Mock Finishing"]

| Sample | X-ray Optical Factor | NMR "Loosening" | TSR, percent | Ten., g.p.d. | Break Elong., percent | Strength Loss, percent | Isomer Ratio, percent tt |
|---|---|---|---|---|---|---|---|
| A | 0.023 | 4.7 | Yarn fused to brittle bundle | | | | 40 |
| B | 0.031 | 3.4 | 4.2 | 0.7 | 198 | 82 | 45 |
| C | 0.041 | 2.9 | 34 | 2.5 | 47 | 36 | 50 |
| D | 0.040 | 2.2 | 44 | 2.6 | 39 | 30 | 55 |
| E | 0.054 | 2.1 | 51 | 3.1 | 38 | 26 | 65 |
| F | 0.058 | | 47 | 3.0 | 32 | 20 | 70 |
| G | 0.071 | 1.8 | 51 | 3.5 | 31 | 18 | 81 |

It is apparent that yarn properties improve markedly when the X-ray-optical factor is above about 0.040, and when the NMR "loosening factor" is less than about 2.5.

EXAMPLE III

This example shows the surprising differenece between the PACM-9 filaments of this invention, and the PACM-10 filaments of the prior art.

Yarn is prepared from polymers of different isomer ratio and type of acid, according to the procedure of Example I. Yarn properties before and after constant length annealing and after "mock finishing" are listed in the following table.

TABLE III

| Polymer | PACM-9 | | PACM-10 | |
|---|---|---|---|---|
| Isomer ratio, percent tt | 31 | 45 | 31 | 45 |
| At room temp., isomer mix. is | Liq. | Solid | Liq. | Solid |
| X-ray polymer melting point, ° C. | 248 | 268 | 248 | 268 |
| Yarn tenacity, g.p.d | 4.4 | 3.8 | 2.4 | 3.1 |
| Modulus, g.p.d | 42 | 43 | 37 | 43 |
| Boil-off shrinkage, percent | 84 | 82 | 80 | 12 |
| Percent Ten. lost after anneal 150° C | 50 | 35 | 0 | 0 |
| After "mock finish": | | | | |
| Tenacity loss, percent | 100 | 82 | 100 | 13 |
| Tenacity, g.p.d | | 0.7 | | 2.7 |
| Modulus, g.p.d | | 13 | | 28 |
| TSR, percent | | 4.2 | | 43 |
| X-ray Optical factor | 0.030 | 0.031 | | |
| NMR "loosening" | 4.0 | 3.4 | | |

It is apparent that both PACM-9 and PACM-10 of 31% tt-isomer content are deficient in heat stability, as shown by high boil-off shrinkage and by fusing on mock finishing. At 45% tt-isomer content, PACM-10 is a satisfactory yarn, while PACM-9 is too unstable.

EXAMPLE IV

Advantages of heat treatment

Filaments from PACM-9 polyamides of various isomer ratios are prepared as described in Example I. Immediately after drawing and before packaging, they are (a) passed through a steam tube as shown by Pitzl in U.S. 3,003,222, relaxing the yarn 13%, or (b) passed in multiple wraps around a hot plate (suitable design being that shown by Heighton in French Patent 1,244,789) at constant length. Contact time with the hot plate is about 0.2 second; the final yarn temperature is about 5° C. below that of the plate. Comparative data, without the heat treatment, are included in the following table. Contact time in the steam tube is about 0.01 second, and the final yarn temperature is believed to be about 100° C.

TABLE IV

[Effect of Heat Treatment]

| Sample | Percent tt Isomer | Treatment | Temp. of Medium, ° C. | X-ray Optical Factor | NMR "Loosening" | TSR, Percent | Boil-off Shrink., Percent |
|---|---|---|---|---|---|---|---|
| A | 45 | None, control | | 0.031 | 3.4 | 4.2 | 82 |
| B | 45 | Steam relax | 150 | 0.031 | 3.0 | (1) | 81 |
| C | 45 | Hot anneal | 150 | 0.038 | 3.4 | 29 | 44 |
| D | 50 | None, control | | 0.041 | 2.9 | 34 | 21 |
| E | 50 | Hot anneal | 150 | 0.059 | 2.4 | 47 | 12 |
| F | 50 | do | 175 | 0.051 | 2.0 | 34 | 8.9 |
| G | 65 | None, control | | 0.054 | 2.1 | 51 | 12 |
| H | 65 | Hot anneal | 150 | 0.077 | (2) | 49 | 10.3 |
| I | 65 | do | 170 | 0.123 | 2.0 | 55 | 7.0 |

[1] Too low to measure.
[2] Not determined.

It is observed that hot annealing improves the structure and properties of the 45% tt yarn (C vs. A), but even this treatment is insufficient to produce an acceptable product. More severe heat treatments cannot be employed due to the thermal degradation of these low tt yarns, as shown in Example II.

It is noted that at 50% tt, the hot anneal at 150° C. (E) produces a sufficient improvement in structure and resulting yarn properties so that this yarn becomes acceptable. The decrease at 175° C. (F) is caused by degradation due to heat sensitivity at this isomer ratio.

Samples G–I show that increasing the treatment temperature gives some improved properties at higher tt isomer level yarns; excessive temperatures should not be employed (see Example V).

EXAMPLE V

Harmful effect of crystallinity

This example shows the harmful effect of annealing treatment at temperatures sufficiently high to induce crystallization.

Filaments from PACM–9 polymer of 60% tt isomer content, 0.98 inherent viscosity, are prepared and annealed at various temperatures, according to the procedures of Examples I and IV. The X-ray crystallinity is also estimated, with the results shown in the table.

TABLE V

[Effect of X-ray Crystallization on Yarn Properties]

| Sample | Anneal. Temp., ° C. | Crystallinity | Tenacity, g.p.d. | WSRA, degrees |
|---|---|---|---|---|
| A | None | None | 4.1 | 265 |
| B | 170 | do | 3.8 | 265 |
| C | 190 | do | 3.7 | 278 |
| D | 200 | Trace | 3.5 | 274 |
| E | 214 | Small amt | 3.4 | 262 |
| F | 227 | Fairly well developed | 2.9 | 236 |
| G | 241 | Well developed | 2.0 | 200 |

In order to be sure that the effect observed is not heat degradation, a portion of sample A is treated with methanol at about 70° C.; methanol is a solvent which promotes crystallization. The tenacity after removing all methanol is about 0.5 g.p.d., the yarn is brittle, and the crystallinity is much greater than that of sample G above. It is noted that the length of the structural repeating unit of the polymer is increased from 10 A. for the noncrystalline polymer to about 22 A. for all the crystalline samples. The predicted length of the PACM–9 unit is about 22 A.

Filament characteristics.—The filaments of the present invention have many properties which are unusual and unexpected when compared to those of other polyamides. For example, the effect of shrinking these filaments is to produce an increase in X-ray orientation and an increase in matrix rigidity (as determined by NMR). It is also surprising that the matrix rigidity of the crystalline fibers is less than that of those which are amorphous.

The filaments can be employed in a variety of construction such as taffeta, broadcloth, etc. which show many of the aesthetic attributes of silk. A study of fiber structure shows some similarities which may be related to the similarity in fabric aesthetics. For example, dry filaments of both PACM–9 and silk maintain higher values of matrix rigidity at elevated temperatures, than do nylon or polyethylene terephthalate. Both PACM–9 and silk show higher matrix rigidity when slack than when taut during the dry NMR test, in contrast to 66-nylon which has no such large difference. Both PACM–9 and silk show higher matrix rigidity when taut than when slack during the wet NMR test. Both PACM–9 and silk show an unusual stiffening of the molecule in water, in extreme contrast to 66–nylon and polyethylene terephthalate which are loosened by water.

PACM–9 differs from silk in showing reversibility in matrix rigidity values as the fiber is cooled from high temperatures. Silk becomes more rigid on dry heating but becomes much less rigid on drying out from the boil. It is believed that this behavior may be related to the improved wash-wear performance of PACM–9 vs. silk.

It has been pointed out previously that the filaments of this invention are especially adaptable to making resilient silk-like fabrics which, unlike silk, give a high level of wash-wear performance. Filaments from PACM–9 polymer of at least 0.5 inherent viscosity, from diamine in a preferred range of 55 to 70% tt isomer content, will normally show a TSR of about 70%, after boil-off, but not heat set which is significantly above the minimum (60) for acceptable "D" wash performance. In contrast, TSR for silk is 40, and for 66–nylon is 60. Trans-trans isomer content above 80% contributes little to fabric properties; due to high melt viscosity at conventional molecular weight, processing is very difficult.

The filaments of the invention are suitable for use in continuous filament form, as staple, crimped tow, floc or the like. They may be used in fabrics of woven, knitted, tufted, pile, non-woven, or felted construction. They are useful for industrial yarn, especially where high modulus, high recovery fibers are required, such as for V-belts, tire cord, laminates and the like. The filaments may be used alone or may be plied or blended with other natural, synthetic or man-made fiber. The filaments of the invention may be dyed, printed, pigmented, bleached, grafted or the like. They may be textured, bulked, heat set, twisted, crimped, or any combination of these processes.

The polymer composition used for the filaments of this invention may contain suitable heat stabilizers, anti-oxidants, light stabilizers, ultra-violet light absorbers, delusterants, pigments, dyes, and the like. Normally, these will not exceed 2% of the fiber weight. Other polymer additives may be present to improve dyeability, soil repellance, crease resistance, hand, water repellence, wickability, strength, elongation, modulus, static propensity, or melting point of the fiber.

What is claimed is:

1. A novel filament of poly[bis(para-aminocyclohexyl)methane-azelamide], wherein at least 55% of the para-aminocyclohexyl methane units are of the trans-trans isomer, the filament having an X-ray-optical factor of at least about 0.040 and a nuclear magnetic reasonance "loosening" factor of less than about 2.5.

2. A novel wash-wear fabric containing filaments of poly[bis(para-aminocyclohexyl)methane-azelamide], said polymer having at least 55% of the para-aminocyclohexyl methane units of the trans-trans isomer and the filaments having an X-ray-optical factor of at least about 0.040 and a nuclear magnetic resonance "loosening" factor of less than about 2.5.

*3. A novel filament of poly[bis(para-aminocyclohexyl)methane-azelamide], wherein at least 55% of the para-aminocyclohexyl methane units are of the trans-trans isomer, the filament having a nuclear magnetic resonance "loosening" factor of less than about 2.5.*

*4. A novel wash-wear fabric containing filaments of poly[bis(para-aminocyclohexyl)methane-azelamide], said polymer having at least 55% of the para-aminocyclohexyl methane units of the trans-trans isomer and the filaments having a nuclear magnetic resonance "loosening" factor of less than about 2.5.*

References Cited

The following references, cited by the Examiner, are of record in the patented file of this patent or the original patent.

UNITED STATES PATENTS

| | | | |
|---|---|---|---|
| 2,512,606 | 6/1950 | Bolten et al. | 260—78 |
| 2,811,410 | 10/1957 | Munch et al. | 18—54 |
| 2,880,057 | 3/1959 | Cuculo | 260—78 |
| 2,918,347 | 12/1959 | Notarbartolo et al. | 18—54 |
| 2,985,503 | 5/1961 | Becker | 18—54 |
| 3,003,222 | 10/1961 | Pitzl | 260—78 |
| 3,053,813 | 9/1962 | Evans et al. | 260—78 |

HAROLD D. ANDERSON, *Primary Examiner*

U.S. Cl. X.R.

57—140; 66—202; 74—233; 139—420; 152—337; 161—227; 260—33.4; 264—176, 210